(12) United States Patent
Lee et al.

(10) Patent No.: US 6,833,901 B2
(45) Date of Patent: Dec. 21, 2004

(54) METHOD FOR FABRICATING LCD HAVING UPPER SUBSTRATE COATED WITH SEALANT

(75) Inventors: Sang Seok Lee, Taegu-kwangyokshi (KR); Sang Ho Park, Pusan-kwangyokshi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 78 days.

(21) Appl. No.: 10/329,412

(22) Filed: Dec. 27, 2002

(65) Prior Publication Data

US 2003/0160937 A1 Aug. 28, 2003

(30) Foreign Application Priority Data

Feb. 27, 2002 (KR) ........................................ 2002-10556
Mar. 13, 2002 (KR) ........................................ 2002-13564

(51) Int. Cl.[7] .................... G02F 1/1341; G02F 1/13; G02F 1/1337
(52) U.S. Cl. .................... 349/189; 349/187; 349/191
(58) Field of Search ..................... 349/187, 189, 349/191; 156/153, 106, 107, 274.8, 275.5

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |

(List continued on next page.)

FOREIGN PATENT DOCUMENTS

| | | |
|---|---|---|
| EP | 1003066 | 5/2000 |
| EP | 1 003 066 A1 | 5/2000 |
| JP | 51065656 | 6/1976 |
| JP | 57038414 | 3/1982 |
| JP | 57088428 | 6/1982 |
| JP | 58027126 | 2/1983 |
| JP | 59057221 | 4/1984 |
| JP | 59195222 | 11/1984 |
| JP | 60111221 | 6/1985 |
| JP | 60164723 | 8/1985 |
| JP | 60217343 | 10/1985 |
| JP | 61007822 | 1/1986 |
| JP | 61055625 | 3/1986 |
| JP | 62089025 | 4/1987 |
| JP | 62090622 | 4/1987 |
| JP | 62205319 | 9/1987 |
| JP | 63109413 | 5/1988 |
| JP | 63110425 | 5/1988 |
| JP | 63128315 | 5/1988 |
| JP | 63311233 | 12/1988 |
| JP | 05127179 | 5/1993 |
| JP | 5154923 | 6/1993 |
| JP | 05265011 | 10/1993 |
| JP | 05281557 | 10/1993 |
| JP | 05281562 | 10/1993 |
| JP | 06051256 | 2/1994 |
| JP | 06148657 | 5/1994 |

(List continued on next page.)

*Primary Examiner*—Robert H. Kim
*Assistant Examiner*—Mike Qi
(74) *Attorney, Agent, or Firm*—McKenna Long & Aldridge LLP

(57) ABSTRACT

Method for fabricating an LCD having the liquid crystal dropping method applied thereto including loading first and second substrates into a bonding chamber, aligning the first and second substrates, bonding the first and second substrates, venting the bonding chamber for applying a pressure to the bonded substrates, inspecting the substrates, and unloading the first and second substrates.

28 Claims, 13 Drawing Sheets

U.S. PATENT DOCUMENTS

| | | | |
|---|---|---|---|
| 5,499,128 A | | 3/1996 | Hasegawa et al. |
| 5,507,323 A | | 4/1996 | Abe |
| 5,511,591 A | * | 4/1996 | Abe .............................. 141/7 |
| 5,539,545 A | | 7/1996 | Shimizu et al. |
| 5,548,429 A | | 8/1996 | Tsujita |
| 5,642,214 A | | 6/1997 | Ishii et al. |
| 5,680,189 A | | 10/1997 | Shimizu et al. |
| 5,742,370 A | | 4/1998 | Kim et al. |
| 5,757,451 A | | 5/1998 | Miyazaki et al. |
| 5,852,484 A | | 12/1998 | Inoue et al. |
| 5,854,664 A | | 12/1998 | Inoue et al. |
| 5,861,932 A | | 1/1999 | Inata et al. |
| 5,875,922 A | | 3/1999 | Chastine et al. |
| 5,952,678 A | | 9/1999 | Ashida |
| 5,956,112 A | | 9/1999 | Fujimori et al. |
| 6,001,203 A | | 12/1999 | Yamada et al. |
| 6,011,609 A | | 1/2000 | Kato et al. |
| 6,016,178 A | | 1/2000 | Kataoka et al. |
| 6,016,181 A | | 1/2000 | Shimada |
| 6,055,035 A | * | 4/2000 | von Gutfeld et al. ........ 349/187 |
| 6,163,357 A | * | 12/2000 | Nakamura .................. 349/155 |
| 6,219,126 B1 | | 4/2001 | Von Gutfeld |
| 6,226,067 B1 | | 5/2001 | Nishiguchi et al. |
| 6,236,445 B1 | | 5/2001 | Foschaar et al. |
| 6,304,306 B1 | | 10/2001 | Shiomi et al. |
| 6,304,311 B1 | * | 10/2001 | Egami et al. ................ 349/189 |
| 6,337,730 B1 | | 1/2002 | Ozaki et al. |
| 6,414,733 B1 | | 7/2002 | Ishikawa et al. |
| 2001/0002100 A1 | | 5/2001 | Compton et al. |
| 2003/0223030 A1 | * | 12/2003 | Byun et al. .................. 349/187 |
| 2004/0001177 A1 | * | 1/2004 | Byun et al. .................. 349/187 |

FOREIGN PATENT DOCUMENTS

| | | |
|---|---|---|
| JP | 6160871 | 6/1994 |
| JP | 6235925 | 8/1994 |
| JP | 06265915 | 9/1994 |
| JP | 6313870 | 11/1994 |
| JP | 7084268 | 3/1995 |
| JP | 07128674 | 5/1995 |
| JP | 07181507 | 7/1995 |
| JP | 08095066 | 4/1996 |
| JP | 8101395 | 4/1996 |
| JP | 08106101 | 4/1996 |
| JP | 08171094 | 7/1996 |
| JP | 08190099 | 7/1996 |
| JP | 08240807 | 9/1996 |
| JP | 09005762 | 1/1997 |
| JP | 09026578 | 1/1997 |
| JP | 9061829 | 3/1997 |
| JP | 09073075 | 3/1997 |
| JP | 09073096 | 3/1997 |
| JP | 09127528 | 5/1997 |
| JP | 09230357 | 9/1997 |
| JP | 09281511 | 10/1997 |
| JP | 09311340 | 12/1997 |
| JP | 10123537 | 5/1998 |
| JP | 10123538 | 5/1998 |
| JP | 10142616 | 5/1998 |
| JP | 10177178 | 6/1998 |
| JP | 10221700 | 8/1998 |
| JP | 10282512 | 10/1998 |
| JP | 10333157 | 12/1998 |
| JP | 10333159 | 12/1998 |
| JP | 11014953 | 1/1999 |
| JP | 11038424 | 2/1999 |
| JP | 11064811 | 3/1999 |
| JP | 11109388 | 4/1999 |
| JP | 11133438 | 5/1999 |
| JP | 11142864 | 5/1999 |
| JP | 11174477 | 7/1999 |
| JP | 11212045 | 8/1999 |
| JP | 11248930 | 9/1999 |
| JP | 11326922 | 11/1999 |
| JP | 11344714 | 12/1999 |
| JP | 2000002879 | 1/2000 |
| JP | 2000029035 | 1/2000 |
| JP | 20000056311 | 2/2000 |
| JP | 20000066165 | 3/2000 |
| JP | 2000137235 | 5/2000 |
| JP | 2000193988 | 7/2000 |
| JP | 2000241824 | 9/2000 |
| JP | 2000284295 | 10/2000 |
| JP | 2000292799 | 10/2000 |
| JP | 2000310759 | 11/2000 |
| JP | 2000310784 | 11/2000 |
| JP | 2000338501 | 12/2000 |
| JP | 2001005401 | 1/2001 |
| JP | 2001005405 | 1/2001 |
| JP | 2001013506 | 1/2001 |
| JP | 2001033793 | 2/2001 |
| JP | 2001042341 | 2/2001 |
| JP | 2001051284 | 2/2001 |
| JP | 2001066615 | 3/2001 |
| JP | 2001091727 | 4/2001 |
| JP | 2001117105 | 4/2001 |
| JP | 2001117109 | 4/2001 |
| JP | 2001133745 | 5/2001 |
| JP | 2001133794 | 5/2001 |
| JP | 2001133799 | 5/2001 |
| JP | 2001142074 | 5/2001 |
| JP | 2001147437 | 5/2001 |
| JP | 2001154211 | 6/2001 |
| JP | 2001166272 | 6/2001 |
| JP | 2001166310 | 6/2001 |
| JP | 2001183683 | 7/2001 |
| JP | 2001209052 | 8/2001 |
| JP | 2001209060 | 8/2001 |
| JP | 2001222017 | 8/2001 |
| JP | 2001235758 | 8/2001 |
| JP | 2001021000 | 9/2001 |
| JP | 2001255542 | 9/2001 |
| JP | 2001264782 | 9/2001 |
| JP | 2001026347 | 10/2001 |
| JP | 2001026348 | 10/2001 |
| JP | 2001272640 | 10/2001 |
| JP | 2001281675 | 10/2001 |
| JP | 2001282126 | 10/2001 |
| JP | 2001305563 | 10/2001 |
| JP | 2001330837 | 11/2001 |
| JP | 2001330840 | 11/2001 |
| JP | 2001356353 | 12/2001 |
| JP | 2001356354 | 12/2001 |
| JP | 2002014360 | 1/2002 |
| JP | 2002023176 | 1/2002 |
| JP | 2002049045 | 2/2002 |
| JP | 2002082340 | 3/2002 |
| JP | 2002090759 | 3/2002 |
| JP | 2002090760 | 3/2002 |
| JP | 2002107740 | 4/2002 |
| JP | 2002122872 | 4/2002 |
| JP | 2002122873 | 4/2002 |
| JP | 2002080321 | 6/2002 |
| JP | 2002202512 | 7/2002 |
| JP | 2002202514 | 7/2002 |
| JP | 2002214626 | 7/2002 |
| KP | 20000035302 | 6/2000 |

* cited by examiner (a)        (b)        (c)

(a)        (b)        (c)

METHOD FOR FABRICATING LCD HAVING UPPER SUBSTRATE COATED WITH SEALANT

This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a liquid crystal display, and more particularly, to a method for fabricating an LCD having a liquid crystal dropping method applied thereto.

2. Background of the Related Art

Keeping pace with development of an information-oriented society, demands on displays increase gradually in a variety of forms and, recently, to meet the demands, different flat display panels, such as Liquid Crystal Display (LCD), Plasma Display Panel (PDP), Electro Luminescent Display (ELD), Vacuum Fluorescent Display (VFD), and the like, have been under development, some of which are employed as displays in various apparatuses.

The LCDs have been most widely used the as mobile displays, while replacing the Cathode Ray Tube (CRT), owing to features and advantages of excellent picture quality, lightweight, thin size, and low power consumption. Besides the mobile-type LCDs of the notebook computer monitors, the LCDs are under development for televisions (TVs) for receiving and displaying broadcasting signals, and computer monitors.

Despite the various technical developments in the LCD, for serving as a display in different fields, the studies for enhancing the picture quality of the LCD as a display are inconsistent with the features and advantages of the LCD in many aspects. Therefore, for employing the LCD in various fields as a general display, the key to development of the LCD lies in whether the LCD can implement a high-quality picture such as high definition, high luminance, and a large sized screen, while having a lightweight, thin size, and a low power consumption.

The LCD is provided with a liquid crystal display panel for displaying a picture and a driving part for providing a driving signal to the liquid crystal display panel, wherein the liquid crystal display panel has first and second glass substrates bonded together with a gap between the substrates, and a liquid crystal layer injected between the first and second glass substrates.

On the first glass substrate, a thin film transistor (TFT) array substrate, there are a plurality of gatelines arranged in one direction at fixed intervals, a plurality of datalines arranged in a direction perpendicular to the gatelines at fixed intervals, a plurality of pixel electrodes in respective pixel regions defined at crossing points of the gatelines and the datalines to form a matrix, a plurality of thin film transistors switchable in response to a signal from the gatelines for transmission of a signal from the dataline to the pixel electrodes.

The second glass substrate (a color filter substrate) has a black matrix layer for shielding light from parts excluding the pixel regions, a red, green, blue (RGB) color filter layer for displaying colors, and a common electrode for implementing a picture.

The foregoing first and second substrates are bonded together, spaced by spacers, with sealant having a liquid crystal injection opening therein, through which liquid crystal is injected.

The liquid crystal is injected by evacuating the space between the bonded two substrates and dipping the liquid crystal injection opening in liquid crystal. The liquid crystal flows in the space between the two substrates by the capillary tube phenomenon. Once the liquid crystal is injected, the liquid crystal injection opening is sealed by the seal.

However, the related art method for fabricating an LCD having the liquid crystal injection method applied thereto has the following problems.

First, the related art method has a poor productivity because the dipping of the liquid crystal injection opening in a liquid crystal while the space between the two substrates are maintained at a vacuum for injection of the liquid crystal takes a long time.

Second, liquid crystal injection, particularly into a large-sized LCD, is likely to cause imperfect filling of the liquid crystal in the panel, which is a cause of a defective panel.

Third, the complicated and lengthy fabrication process results in a requirement for many liquid crystal injection devices, which occupy much space.

Accordingly, a method for fabricating an LCD by using a liquid crystal dropping method has been under research recently. A Japanese laid-open patent publication No. 2000-147528 discloses the following liquid crystal dropping method.

A related art method for fabricating an LCD having the foregoing liquid crystal dropping method applied thereto will be explained. FIGS. 1A–1F the steps of a related art method for fabricating an LCD.

Referring to FIG. 1A, UV sealant 1 is coated on a first glass substrate 3 having a thin film transistor array formed thereon to a thickness of approximately 30 μm and liquid crystal 2 is dropped on an inner side of seal 1 (a thin film transistor array part). No liquid crystal injection opening is provided in seal 1.

The first glass substrate 3 is mounted on a table 4 in a vacuum container 'C' which is movable in a horizontal direction and held by a first suction device 5 holding an entire bottom surface of the first glass substrate 3 by vacuum.

Referring to FIG. 1B, an entire bottom surface of the second glass substrate 6 having the color filter array formed thereon is held by a second suction device 7 by vacuum and the vacuum container 'C' is closed and evacuated. The second suction device 7 is moved down in a vertical direction until a gap between the first and second glass substrate 3 and 6 becomes approximately 1 mm and the table 4 with the first glass substrate 3 thereon is moved in a horizontal direction, to pre-align the first and second glass substrates 3 and 6.

Referring to FIG. 1C, the second suction device 7 is moved down until the second glass substrate 6 comes into contact with the liquid crystal 2 or the seal 1.

Referring to FIG. 1D, the table 4 with the first glass substrate 3 thereon is moved in a horizontal direction to align the first and second glass substrates 3 and 6.

Referring to FIG. 1E, the second suction device 7 is moved down until the second glass substrate 6 comes into contact with the seal 1 and is pressed down until a gap between the second glass substrate 6 and the first glass substrate 3 becomes about 5 μm.

Referring to FIG. 1F, the bonded first and second glass substrates 3 and 6 are taken out of the vacuum container 'C' and an ultraviolet (UV) ray is directed to the seal 1, to set the seal 1, thereby finishing fabrication of the LCD.

However, the foregoing related art method for fabricating an LCD having the liquid crystal dropping method applied thereto has the following problems.

First, the sealant coating and liquid crystal dropping on the same substrate requires a long fabrication time period before the two substrates are bonded.

Second, as the sealant is coated and the liquid crystal is dropped on the first substrate while no progress is made for the second substrate, there is an unbalance of a fabrication process between the first and second substrates, which implies an ineffective operation of the production line.

Third, because the sealant is coated and the liquid crystal is dropped on the first substrate, the first substrate with a coat of the sealant applied thereto cannot be cleaned by an ultrasonic cleaner (USC). Therefore, as the sealant that is to bond the two substrates should not be washed away, particles cannot be removed, which may cause defective contact of the sealant during bonding.

Fourth, since a bonded state cannot be inspected while the bonded substrates are in the bonding container, alignment of the two substrates cannot be inspected, therefore a separate inspection apparatus is required.

Fifth, the alignment of the first and second substrates, with the liquid crystal or seal, which comes into contact with the second substrate, is likely to damage the alignment film on the second substrate that actually comes into contact with the liquid crystal or the seal, which deteriorates picture quality. Moreover, if the level of the first and/or second substrate is not correct, with a possibility of the first and second substrates coming into contact, the patterns on respective substrates are likely to be scratched and a thickness of the seal may not be even.

Sixth, the alignment of the substrates doubled, only varying a distance between the two substrates, has a limitation in accurate alignment of the two substrates.

Seventh, the bonding of the two substrates only by a physical force of the table and the second suction device may cause defective bonding due to non-uniform application of pressure throughout the substrate in the case where levels of the table and the second suction device are not correct.

Eighth, the introduction of air into the vacuum container for restoring the vacuum container to atmospheric pressure after the bonding may deteriorate a state of the vacuum container due to moisture contained in the air.

SUMMARY OF THE INVENTION

Accordingly, the present invention is directed to a method for fabricating a liquid crystal display that substantially obviates one or more of the problems due to limitations and disadvantages of the related art.

An advantage of the present invention is to provide a method for fabricating an LCD having the liquid crystal dropping method applied thereto, which can shorten a fabrication time period, maximize efficiencies of alignment and pressure application, and check alignment of the substrates having a pressure applied thereto within a bonding chamber, for improving a productivity.

Additional features and advantages of the invention will be set forth in the description, which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for fabricating an LCD includes loading first and second substrates into a bonding chamber; aligning the first and second substrates; bonding the first and second substrates; venting the bonding chamber for applying a pressure to the bonded substrates; inspecting the substrates; and unloading the first and second substrates.

In another aspect of the present invention, there is provided a method for fabricating an LCD, including loading a first substrate having liquid crystal dropped thereon and a second substrate having sealant coated thereon; bonding the first and second substrates; venting the bonding chamber, for applying a pressure to the bonded substrates until a gap between the two substrates is below about 5 μm, and unloading the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings. FIGS. 2A–2L illustrate the steps of a method for fabricating an LCD having a liquid crystal dropping method applied thereto in accordance with an embodiment of the present invention schematically. FIG. 3 illustrates a flowchart showing the steps of bonding in accordance with an embodiment of the present invention.

Figure 1A:
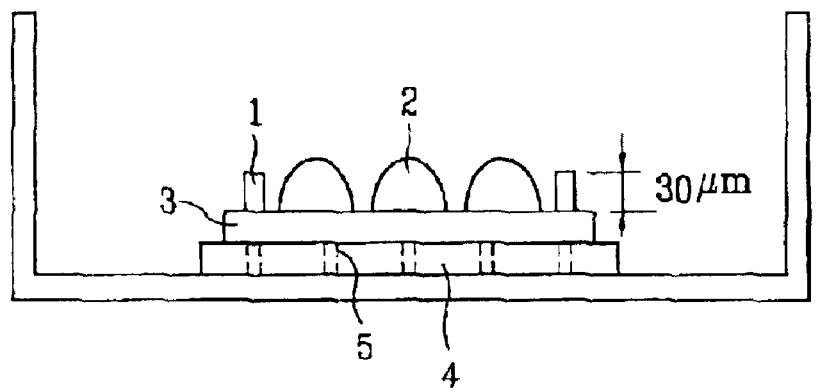
FIGS. 1A–1F illustrate the steps of a related art method for fabricating an LCD having a liquid crystal dropping method applied thereto, schematically.
Figure 1B:
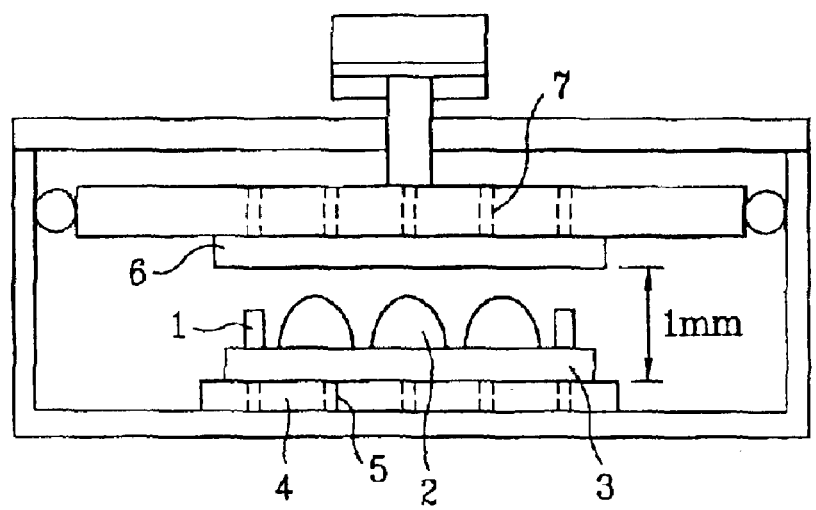
Figure 1C:
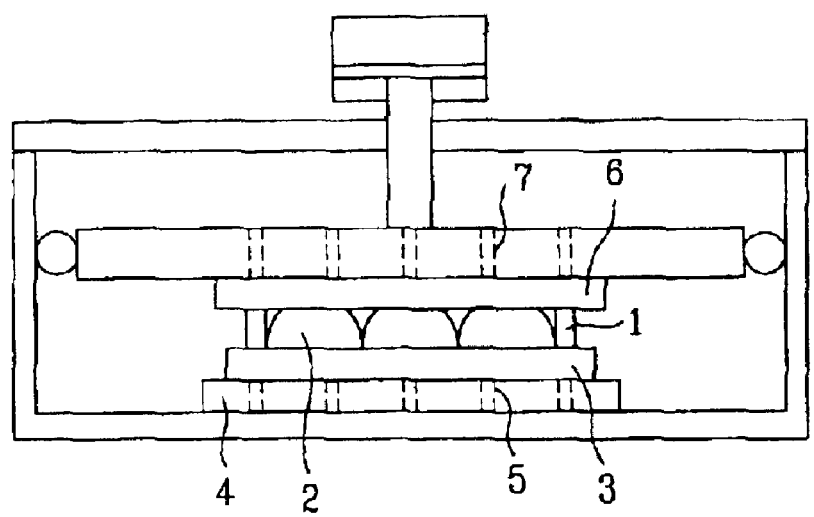
Figure 1D:
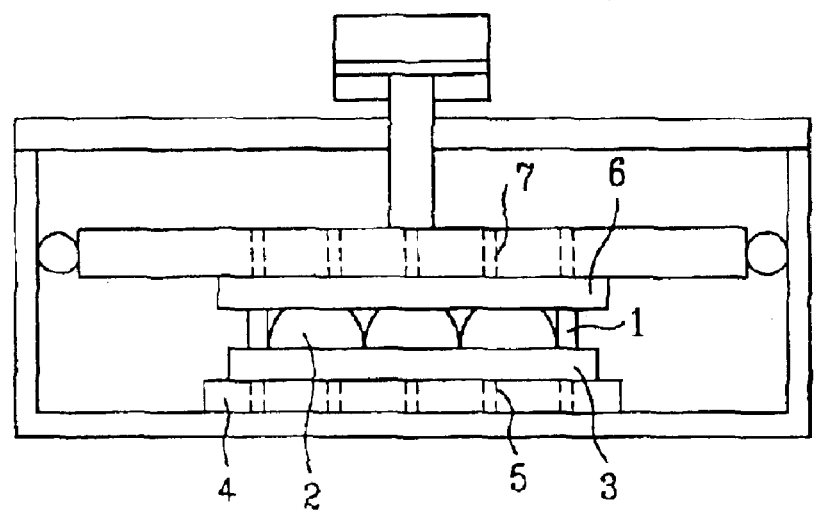
Figure 1E:
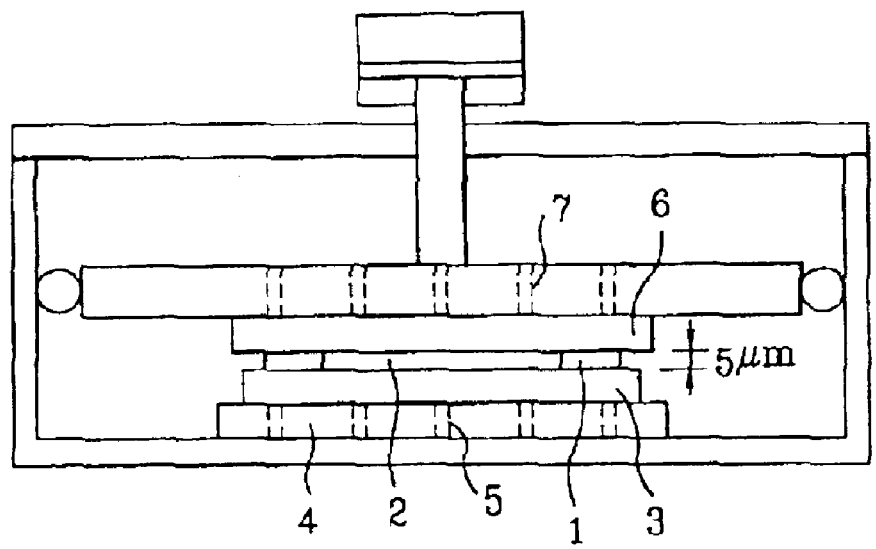
Figure 1F:
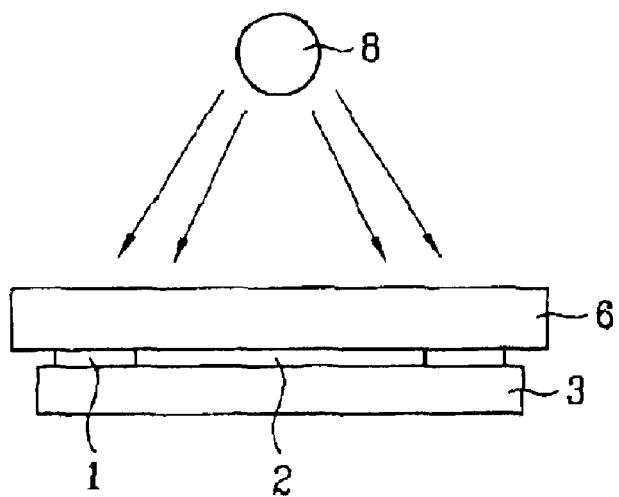
Figure 2A:
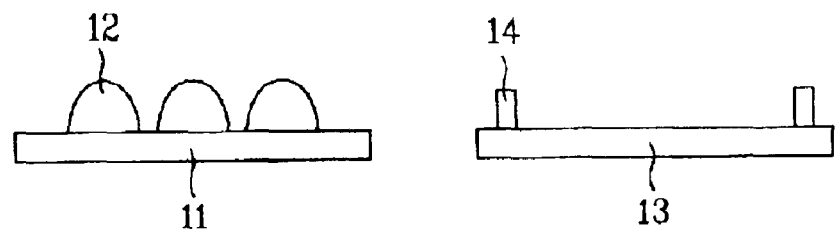
FIGS. 2A–2L illustrate the steps of a method for fabricating an LCD having a liquid crystal dropping method applied thereto in accordance with a embodiment of the present invention, schematically.
Figure 3:
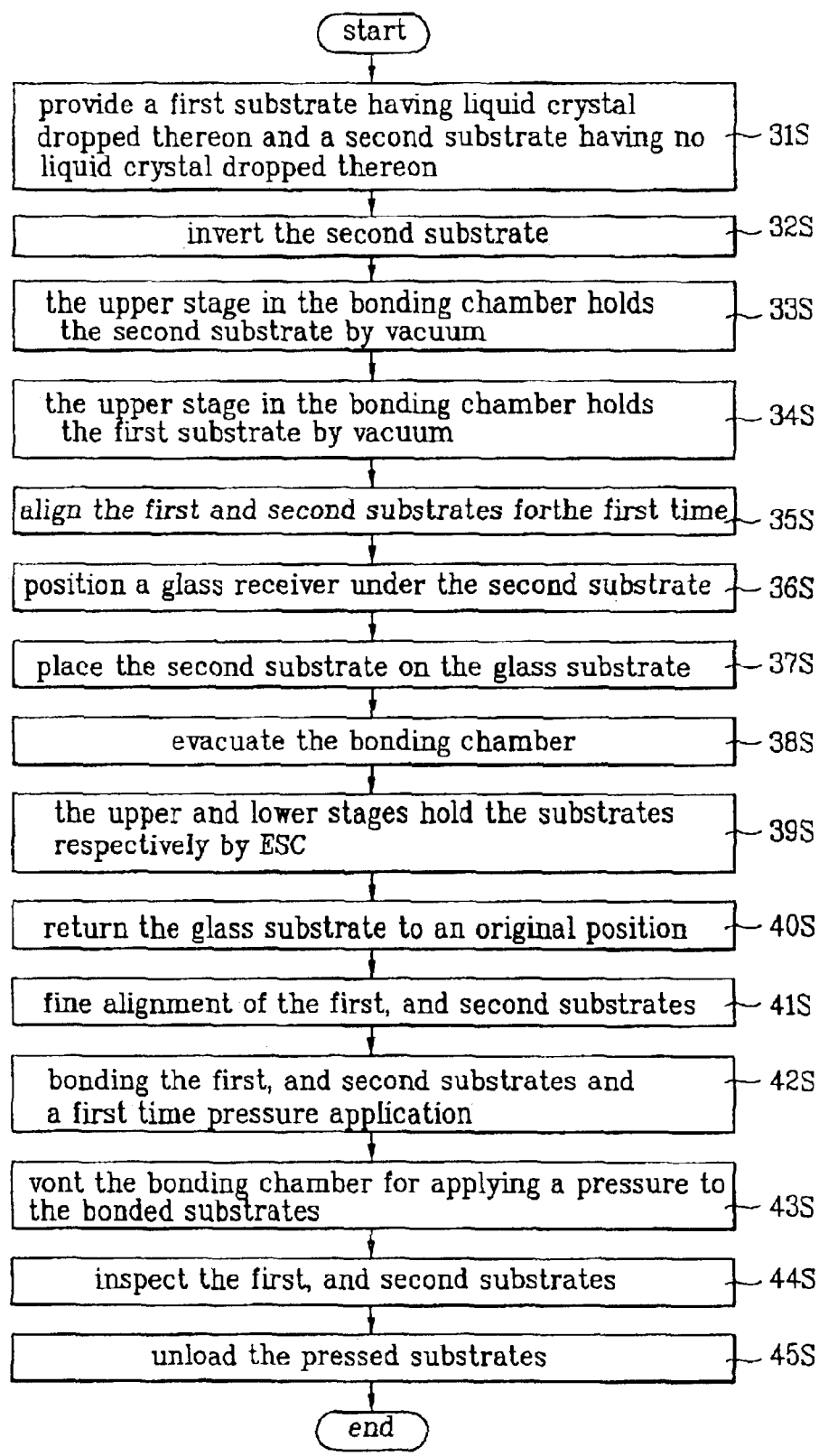
FIG. 3 illustrates a flow chart showing the steps of bonding in accordance with a preferred embodiment of the present invention.

Referring to FIG. 2A, a first glass substrate 11 having liquid crystal 12 dropped thereon and a second substrate 13 having seals 14 coated thereon are provided (step 31S in FIG. 3). A plurality of panels are designed on one of the first and second glass substrates 11 and 13, each with a thin film transistor array formed thereon. A plurality of panels are designed on the other glass substrate in correspondence with the panels on the one glass substrate, each with a color filter array formed thereon having a black matrix layer, a color filter layer, a common electrode, and the like. For convenience of explanation, the substrate with the thin film transistor array is referred to as a first glass substrate 11 and the substrate having the color filter array is referred to as a second glass substrate 13.

The second glass substrate 13 having the sealant coated thereon is cleaned with an Ultra Sonic Cleaner (USC) to remove particles formed during fabrication. That is, the second glass substrate 13 can be cleaned as the second glass substrate 13 has no liquid crystal dropped thereon, but the sealant coated thereon.

Figure 2B:
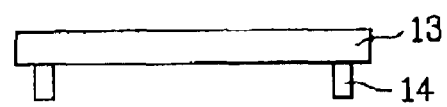

It is necessary to invert one of the substrates since the first glass substrate 11, having the liquid crystal 12 dropped thereon, and the second glass substrate 13, having the sealant 14 coated thereon, are provided with surfaces thereof faced upward, respectively, for bonding together. Referring to FIG. 2B, since the substrate having the liquid crystal dropped thereon cannot be inverted, the second glass substrate 13, having the sealant coated thereon, is inverted such that the surface having the sealant coated thereon faces downward (step 32S in FIG. 3).

In the inversion, the second substrate is loaded on a table of an inverter, pre-aligned, and the second substrate is held at the table by vacuum and clamped. The table is turned upside down and the inverted second substrate is carried to the bonding chamber.

Figure 2C:
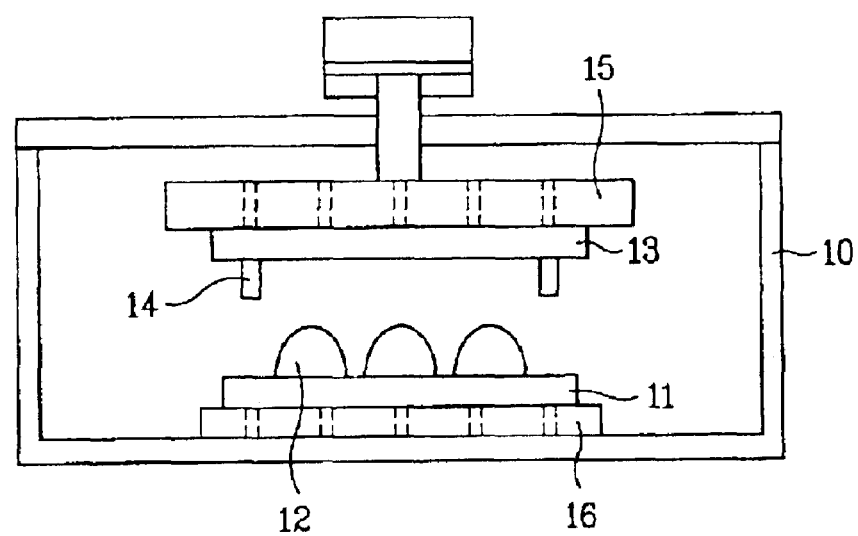

Referring to FIG. 2C, the second substrate is held at the upper stage 15 in the bonding chamber 10 by vacuum suction, with the surface thereon having the sealant 14 coated thereon faced downward (step S33 in FIG. 3). The first glass substrate 11 having the liquid crystal 12 dropped thereon is held at the lower stage 16 by vacuum suction (step 34S in FIG. 3). In this instance, the vacuum bonding chamber 10 is at atmospheric pressure. It will be explained in more detail, which follows.

A loader of a robot (not shown) places the inverted second glass substrate 13, having the sealant 14 coated thereon, in the vacuum bonding chamber 10 with the surface sealant 14 coated thereon face down. In this state, the upper stage 15 in the vacuum bonding chamber 10 is moved downward, holds the second glass substrate 13 by vacuum, and moved upward. Instead of the vacuum, an electrostatic suction may be used.

Then, the loader of the robot is moved out of the vacuum bonding chamber 10, and the first glass substrate 11 having the liquid crystal 12 dropped thereon is placed on the lower stage 16 in the vacuum bonding chamber 10 by the loader of the robot.

Though it has been explained that the liquid crystal 12 is dropped on the first glass substrate 11 having the thin film transistor array formed thereon, and the sealant is coated on the second glass substrate 13, the sealant may be coated on the first glass substrate 11 and the liquid crystal may be dropped on the second substrate. Alternatively, both the liquid crystal dropping and the sealant coating may be made on either of the two glass substrates, as long as one substrate with the liquid crystal dropped thereon is placed on the lower stage and the other substrate is held at the upper stage.

Figure 2D:
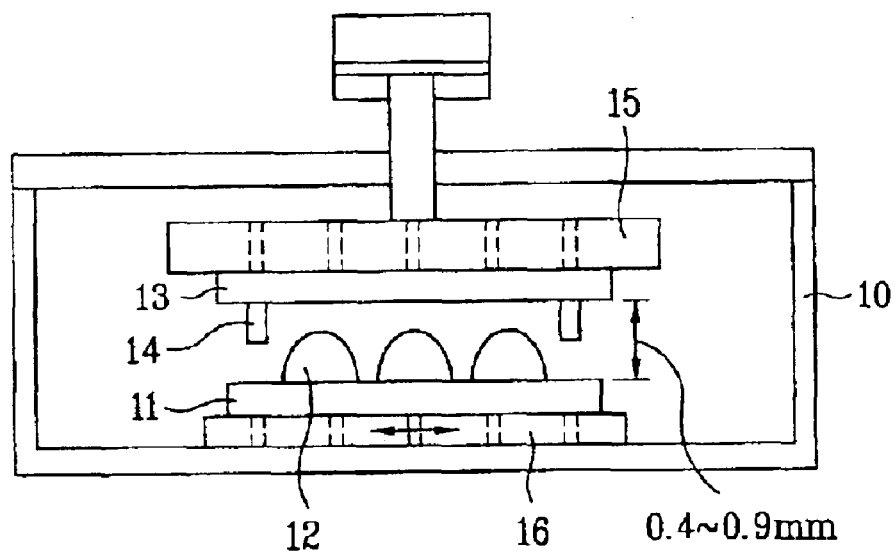

Referring to FIG. 2D, the upper stage 15 is moved downward until a gap between the first substrate 11 and the second substrate 13 is in a range of about 0.4 mm~0.9 mm, and the lower stage is moved in a horizontal direction, to pre-align the first substrate 11 and the second substrate 13 by using rough alignment marks (step 35S in FIG. 3). The alignment of the rough alignment marks will be explained later and the pre-alignment may be omitted as necessary.

Figure 2E:
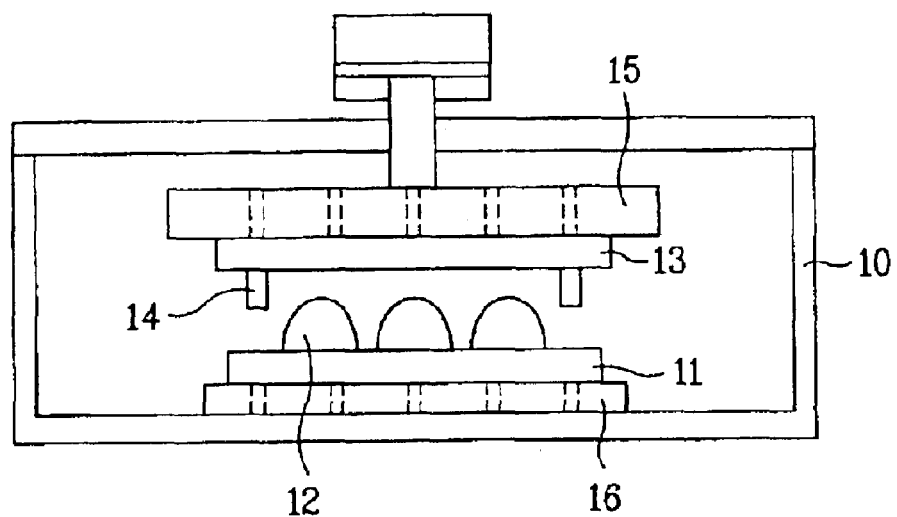

Then, referring to FIG. 2E, after the upper stage 15 moved upward, a glass receiver (not shown) is placed under the second glass substrate 13 and held at the upper stage 15 (step 36S in FIG. 3), to place the second substrate 13 on the glass receiver (step 37S in FIG. 3).

In this instance, the glass receiver is placed under the second glass substrate 13, for preventing the second glass substrate held at the upper stage by vacuum from falling off the upper stage and down to the first glass substrate 11. This is due to loss of the vacuum force of the stages coming from a vacuum in the vacuum bonding chamber becoming higher than the vacuum of the stages as the vacuum bonding chamber 10, which is evacuated in a state where the stages 15 and 16 hold the first and second glass substrates by vacuum, respectively.

Accordingly, the second glass substrate 13 held at the upper stage by vacuum may be placed down on the glass receiver before evacuating the vacuum bonding chamber. Alternatively, the upper stage holding the second glass substrate and the glass receiver may be brought to be at a certain distance so that the second glass substrate 13 is placed on the glass receiver from the upper stage during the evacuation of the chamber. Moreover, means for holding the substrates may be additionally provided as there may occur an air flow in the chamber at an initial stage that can shake the substrates when the evacuation of the vacuum bonding chamber is started.

The vacuum bonding chamber 10 is evacuated (step 38S in FIG. 3). Though dependent on liquid crystal modes intended to be bonded, the vacuum in the vacuum bonding chamber 10 is in a range of about $1.0 \times 10^{-3}$ Pa to about 1 Pa in an in plane switching (IPS) mode and approximately $1.1 \times 10^{-3}$ Pa to about $10^2$ Pa in a twisted nematic (TN) mode.

The evacuation of the vacuum bonding chamber 10 may be carried out in two stages. That is, after the substrates are respectively adsorbed to the upper and the lower stages and a chamber door is closed, a first evacuation is started. Then, after bringing the glass receiver under the upper stage and placing the substrate held at the upper stage on the glass receiver or bringing the upper stage and the glass receiver to be at a certain distance in a state the upper stage holds the substrate by vacuum, the vacuum bonding chamber is evacuated for the second time. In this instance, the second evacuation is faster than the first evacuation and the first evacuation is made such that the vacuum of the vacuum bonding chamber is not higher than the vacuum suction force of the upper stage.

Alternatively, without dividing the evacuation into first and second phases, after the substrates are held at respective stages and closing the chamber door, the evacuation may be started and the glass receiver may be brought to an underside of the upper stage during the evacuation. It is required that the glass receiver is brought to the underside of the upper stage before the vacuum of the vacuum bonding chamber becomes higher than the vacuum adsorbing force of the upper stage.

Thus, the evacuation of the vacuum bonding chamber is done in two stages for preventing deformation or shaking of the substrate in the vacuum bonding chamber caused by rapid evacuation of the vacuum bonding chamber.

Once the vacuum bonding chamber 10 is evacuated to a preset vacuum, the upper and lower stages 15 and 16 hold the first and second glass substrates 11 and 13, respectively, by Electro Static Charge (ESC) (step 39S in FIG. 3), and the glass receiver is returned to an original position (step 40S in FIG. 3).

Figure 2F:
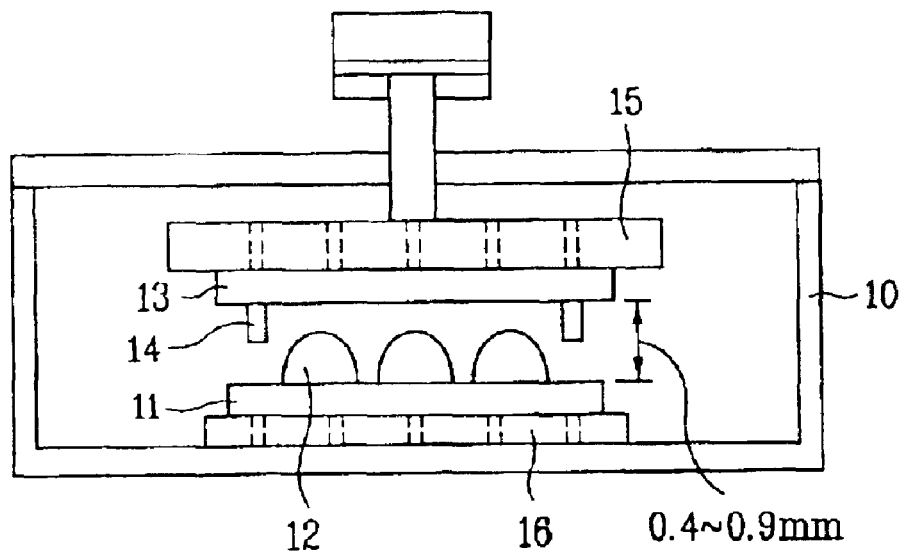
Figure 2G:
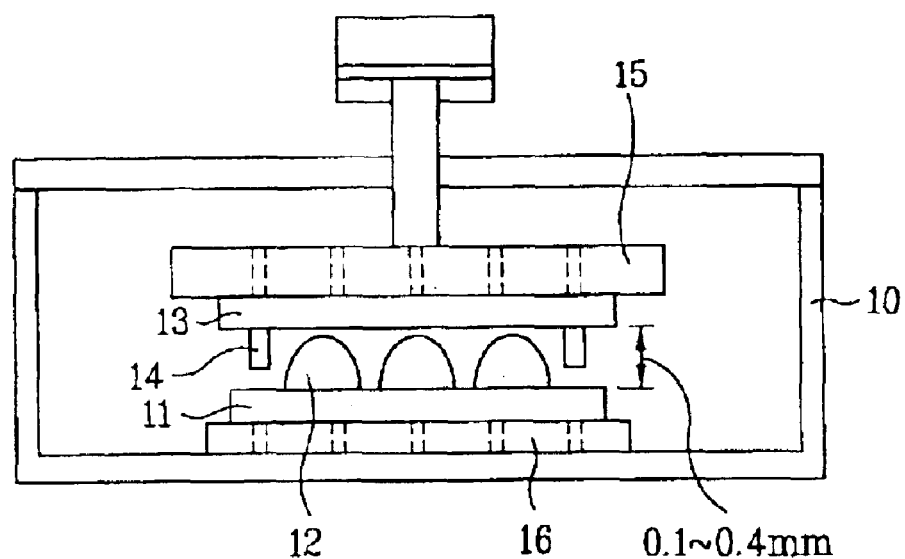

Referring to FIGS. 2F and 2G, the upper stage is moved downward to position the second glass substrate 13 close to the first glass substrate, the first glass substrate 11 and the second glass substrate 13 are aligned (step 41S in FIG. 3).

The aligning method will be explained in more detail.

FIGS. 4A–4C explain a rough alignment mark for explaining an alignment method in accordance with an embodiment of the present invention. FIGS. 5A–5C explain a fine alignment mark for explaining an alignment method in accordance with an embodiment of the present invention. FIG. 6 explains a camera focusing position in an alignment of the present invention.

Figure 4:
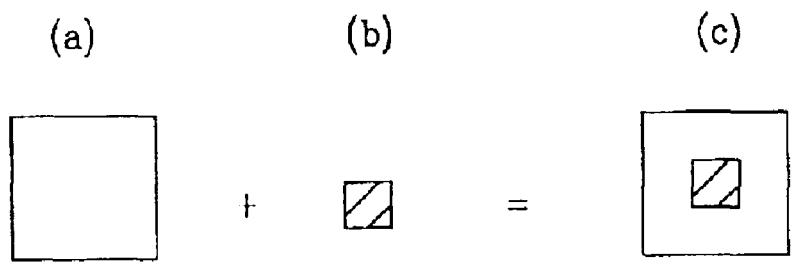
FIGS. 4A–4C explain rough alignment marks for alignment of the present invention.
Figure 5:
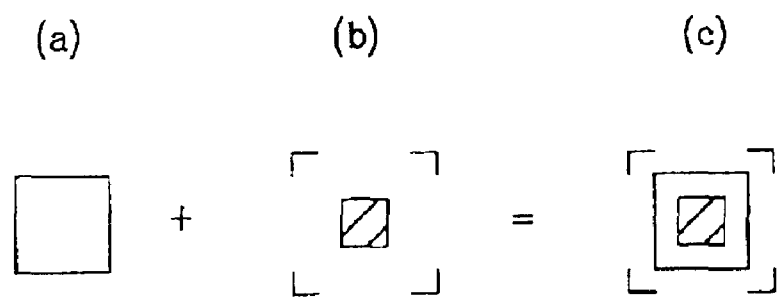
FIGS. 5A–5C explain fine alignment marks for alignment of the present invention.
Figure 6:
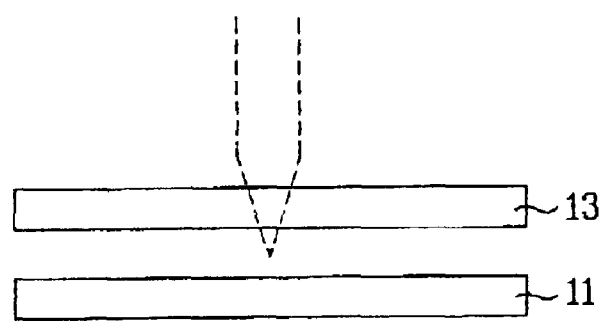
FIG. 6 explains the focusing position of the camera in the alignment of the present invention.

Referring to FIGS. 4 and 5, the first glass substrate 11 and the second glass substrate 13 have a plurality of rough alignment marks (approximately 3 μm size) in FIG. 4 and a plurality of fine alignment marks approximately 0.3 μm size in FIG. 5 carved therein. The first glass substrate 11 has the rough alignment mark as shown in FIG. 4A and the fine alignment mark as shown in FIG. 5A carved therein. The second glass substrate 13 has the rough alignment mark as shown in FIG. 4B and the fine alignment mark as shown in FIG. 5B carved therein. There is a camera for aligning the rough alignment marks and a camera for aligning the fine alignment marks provided for the vacuum bonding machine, separately. The cameras are provided separately because alignment of the rough alignment marks and the fine alignment marks by means of one camera is difficult due to a size difference and a location difference of the rough alignment marks and the fine alignment marks.

Accordingly, as shown in FIG. 2F, first, the upper stage is moved downward until a gap between the first glass substrate 11 and the second glass substrate 13 is in a range of about 0.4 mm–0.9 mm (e.g., about 0.6 mm). The first glass substrate 11 is aligned with the second glass substrate 13 such that the rough alignment mark (FIG. 4B) carved in the second glass substrate 13 is located within the rough alignment mark (FIG. 4A) carved in the first glass substrate 11 accurately by moving the lower stage 16 in a horizontal direction. Second, as shown in FIG. 2G, the upper stage is moved downward until a gap between the first glass substrate 11 and the second glass substrate 13 is in a range of about 0.1 mm–0.4 mm (e.g., about 0.2 mm), and the first glass substrate 11 is finely aligned with the second glass substrate 13 such that the fine alignment mark (FIG. 5B) carved in the second glass substrate 13 is located within the fine alignment mark (FIG. 5A) carved in the first glass substrate 11 accurately by moving the lower stage 16 in a horizontal direction. In the fine alignment mark alignment, the liquid crystal 12 dropped on the first glass substrate 11 may come into contact with the second glass substrate 13 as required.

In the alignment of the rough alignment marks with the fine alignment marks, the cameras may be fitted to an upper side or a lower side of the substrate using a focused middle point between the mark in the second glass substrate 13 and the mark in the first glass substrate 11 as shown in FIG. 6. Alternatively, a focal distance of the camera may be varied to focus the mark in the second glass substrate 13 and to focus the mark in the first glass substrate 11 alternately for improving accuracy of the alignment. For example, the alignment of the rough alignment marks is made by focusing at a point in the middle of the mark in the second glass substrate 13 and the mark in the first glass substrate 11. The alignment of the fine alignment marks is made by varying a focal distance, to focus the mark in the second glass substrate 13 and the mark in the first glass substrate 11, alternately.

A number of the rough alignment marks and the fine alignment marks on the first glass substrate 11 and the second glass substrate 13 are at least four or more, respectively, and may be increased as the size of the substrate becomes larger for improvement of accuracy. The rough alignment marks and the fine alignment marks are formed in parts between panels which are to be cut, or a periphery of the substrates on which the plurality of panels are formed.

FIGS. 4C and 5C illustrate when the rough alignment marks and the fine alignment marks are aligned, wherein, since the first glass substrate 11 is aligned with the second glass substrate 13 by using different cameras, the alignment can be made faster and more accurately.

Alignment of the rough alignment mark may be carried out in the same fashion in the pre-alignment step (step 35S in FIG. 3).

Figure 2H:
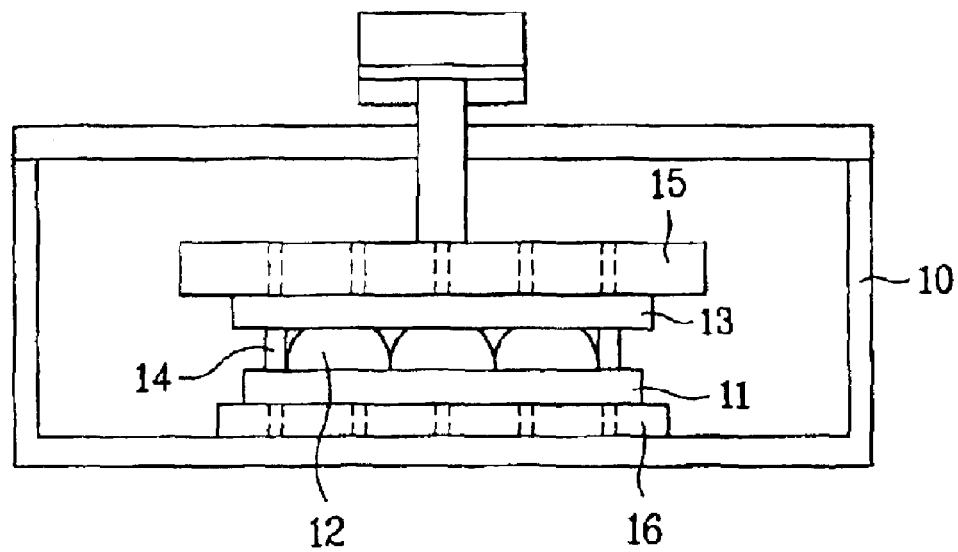

Referring to FIG. 2H, thus when the two substrates are aligned, the upper stage 15 is moved downward in a state where the two glass substrates 11 and 13 are held at respective stages 15 and 16 by the ESC, to press down the first and second glass substrates 11 and 13 for bonding the two substrates 11 and 13 (first application of pressure) (step 42S in FIG. 3). The first and second glass substrates 11 and 13 are pressed by moving either the upper stage 15 or the lower stage 16 in a vertical direction, while varying speeds and pressures of respective stages. That is, until the time the liquid crystal 12 on the first glass substrate 11 and the second glass substrate 13 come into contact or until the time sealant on both on the first glass substrate 11 and the second glass substrate 13 come into contact, the stages are moved at a fixed speed or fixed pressure, and the pressure is boosted step by step from the time of the contact to a desired final pressure. That is, the time of contact is sensed by a load cell fitted to a shaft of the movable stage, and the two glass substrates 11 and 13 are pressed at a pressure of about 0.1 ton at the time of contact, at a pressure of about 0.3 ton at an intermediate stage, at a pressure of about 0.4 ton at an end stage and at a pressure of about 0.5 ton at the final stage.

In this instance, though the upper stage presses down the substrate by means of one shaft, a plurality of shafts may be provided each fitted with individual load cell, for independent application of pressure. According to this, if the lower stage and the upper stage are not leveled and fail to press down uniformly, a pertinent shaft may be pressed at a lower or higher pressure for uniform bonding of the sealant.

Figure 2I:
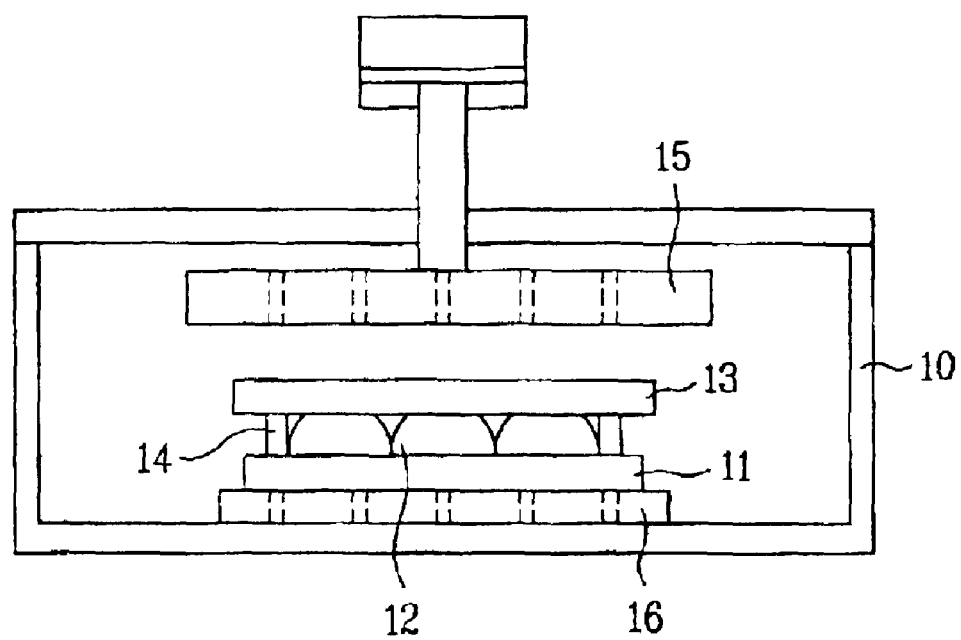

Referring to FIG. 2I, upon finishing the bonding by applying pressure to the two substrates, after ESC is off, the upper stage 15 is moved upward to separate the upper stage 15 from the bonded two glass substrates 11 and 13.

Figure 2J:
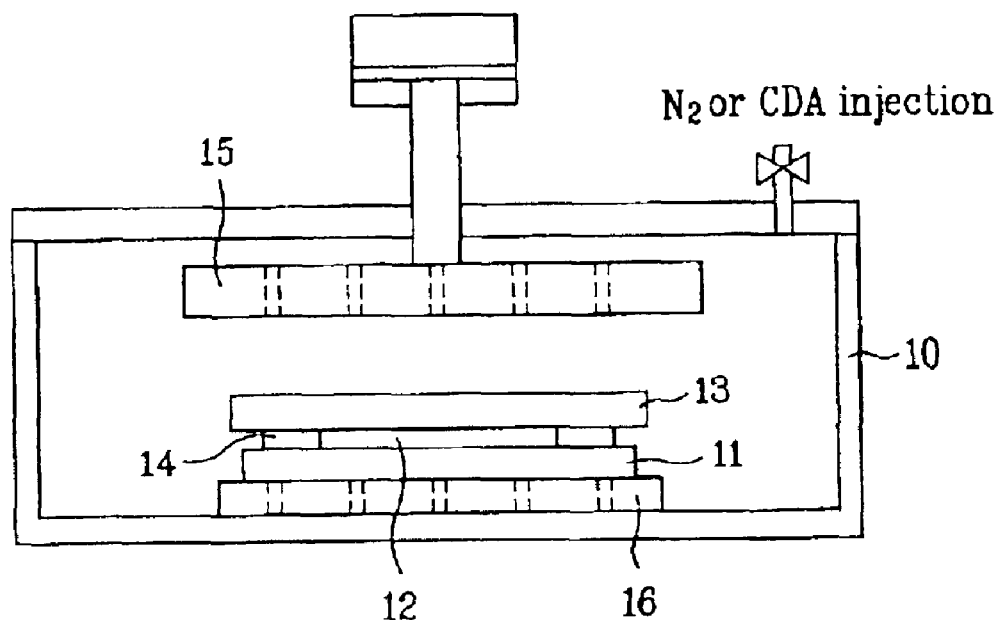

Then, referring to FIG. 2J, for changing the bonding chamber 10 from a vacuum state to an atmospheric state and applying a pressure to the bonded substrate uniformly, a gas, such as $N_2$, or clean dry air (CDA) is supplied to the bonding chamber 10, to vent the vacuum bonding chamber (step 43S in FIG. 3).

Thus, when the vacuum bonding chamber 10 is vented, since a gap between the first and second glass substrates bonded by the sealant 14 is in a vacuum state and the vacuum bonding chamber 10 is in an atmospheric state, the first and second glass substrates 11 and 13 are pressed uniformly by the atmospheric pressure to have a uniform gap. The bonded first and second substrates are pressed, not only by the atmospheric pressure, but also by an injection force of the $N_2$ or dry air introduced thereto during venting.

The uniform pressure application to the two substrates is most important during the venting of the chamber. The uniform pressure application to various parts of the substrates is required for forming the sealant between the two substrates to have the same height, uniform spreading of the liquid crystal, thereby preventing cracking of the sealant, or imperfect filling of the liquid crystal. Moreover, for the uniform application of pressure to various parts of the substrates while venting the chamber, a direction of the venting is important. Accordingly, the present invention provides the following embodiments.

First, a plurality of tubes may be formed above the chamber, for introducing gas into the chamber. Second, a plurality of tubes may be formed below the chamber, for introducing gas into the chamber. Third, a plurality of tubes may be formed on sides the chamber, for introducing gas into the chamber. The above methods may be applied in parallel. Though the gas is introduced from above the chamber, the direction of venting is fixed taking a size of the substrate, a stage state, and the like into account.

Moreover, the two substrates 11 and 13 are pressed, not only by the atmospheric pressure, but also the injection force of the gas introduced into the chamber during the venting. Though the pressure applied to the two substrates during the venting is atmospheric ($10^5$ Pa), a pressure in a range of about 0.4~3.0 $kg/cm^2$ is appropriate and, for example, at about 1.0 $kg/cm^2$. However, the pressure can be varied with the size of the substrate, a gap between the substrates, the thickness of the sealant, and the like.

The plurality of gas injection tubes may be at least more than two according to the size of the substrate and, herein, about 8.

In order to prevent the substrates from shaking, setting means or method may be used which can prevent the substrate from shaking (movement).

Since it is likely that the substrates are shaken and misaligned if the chamber is vented rapidly, the gas may be vented step by step and a slow valve for supplying the gas slowly can be provided, additionally. That is, the venting may be completed once after starting the venting, or the venting is started slowly at first, to avoid shaking of the substrate, and once the first venting reaches to a certain point, a rate of the venting may be changed to reach to the atmospheric pressure more quickly.

Since it is likely that the bonded substrates on the stage are shaken and misaligned by the gas if the chamber is vented, the time of the gas injection is also important.

The venting of the chamber is started when the gap between the substrates becomes vacuum as the first pressure application is progressed after finishing the alignment. A detailed vent starting method will be explained.

First, the venting may be started after the upper stage is moved upward and, second, the venting may be started after the upper stage is started to move, but before finishing the movement for reducing a fabrication time period. The upper stage may be moved upward while blowing the gas or the air through the upper stage.

Third, the venting may be started at the same time with moving the upper stage upward, when the gas or dry air can be blown through the upper stage, for an easy separation of the substrates from the upper stage (because there may be problems when the bonded substrates are not separated from the upper stage easily), or shaken and dropped down below the lower stage.

Fourth, the venting of the chamber may be started without moving the upper or the lower stage in a state when the bonding is done. In this instance, the upper stage may be moved in a stage when venting of the chamber is finished, or the upper stage may be started to be moved before the venting of the chamber is finished. The upper stage may be also moved up while the gas or dry air is blown through the upper stage, for an easy separation of the substrates from the upper stage (because there may be problems when the bonded substrates are not separated from the upper stage easily), or shaken and dropped down below the lower stage.

The bonding chamber 10 is vented, thus, to apply pressure to the two substrates, down to a gap between the two substrate to be about 5 $\mu$m. That is, when the pressure is applied to the first and second substrates by the upper/lower stages 15 and 16 in the bonding chamber 10, with a height of the sealant formed to be about 35~45 $\mu$m, a gap between the substrates becomes about 25~35 $\mu$m. Then, when the venting is carried out, the gap becomes below about 6 $\mu$m at a part where the sealant is coated and below about 5 $\mu$m at the panel part (cell region).

Figure 2K:
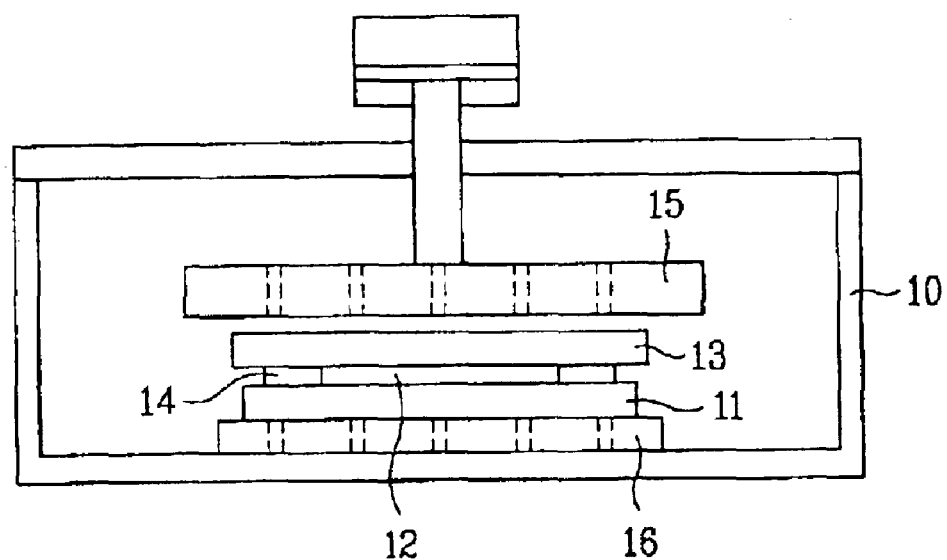

Referring to FIG. 2K, after the venting is finished, the substrates are inspected for possible misalignment of the substrate during the venting (step 44S in FIG. 3). In the inspection, after the upper stage is moved down onto the pressed first and second substrates, the rough alignment marks and the fine alignment marks printed on the first and second substrates are monitored by using the cameras. As a result of the monitoring, if the rough alignment marks and the fine alignment marks are aligned properly, the alignment is determined correct. If the rough alignment marks and the fine alignment marks are not aligned properly, the alignment is determined to be not correct. This information is provided in a database for changing a fabrication condition of the bonding machine.

That is, as a result of the inspection, if a +Y axis misalignment of the marks keep occurring, the alignment is made such that a misalignment occurs in a −Y axis direction for making an accurate alignment after the venting.

Figure 2L:
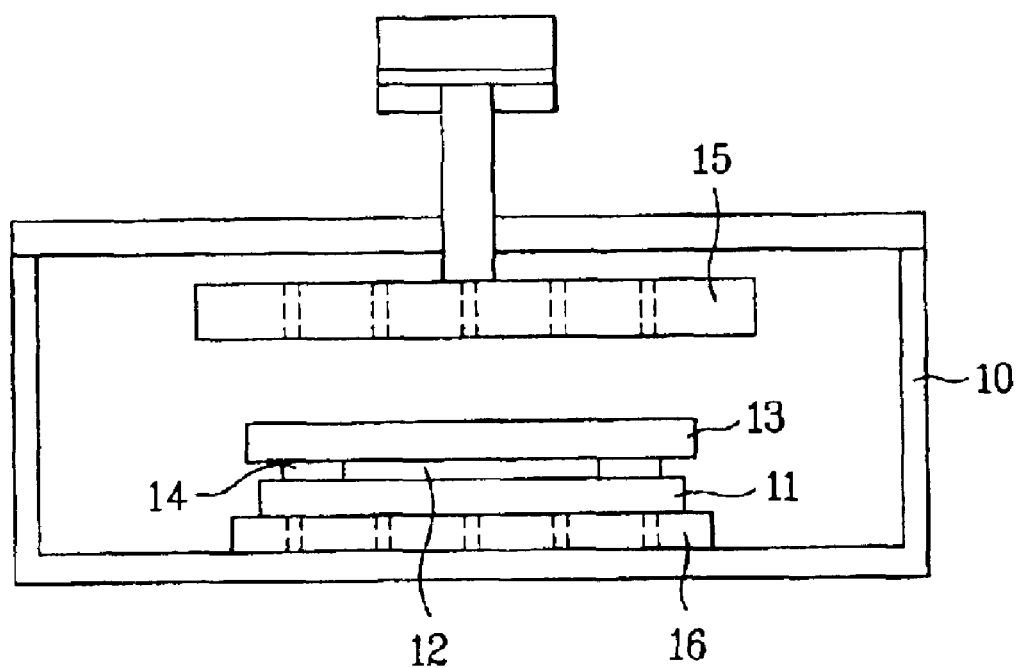

Referring to FIG. 2L, when the inspection is finished, the upper stage 15 is moved upward and the substrates are unloaded (step 45S in FIG. 3). That is, after the upper stage 15 is moved upward, the first and second glass substrates 11 and 13 are unloaded by using the loader of the robot, or after the upper stage 15 holds the first and second glass substrates 11 and 13 by vacuum and is moved upward. The loader of the robot can unload the first and second substrates from the upper stage 16.

For reducing the fabrication time period, after one of the first glass substrate 11 and the second glass substrate 13, which are to be bonded next, is loaded on the stage, the pressed first and second glass substrates may be unloaded. That is, after the second glass substrate 13 is to be bonded in the next step is brought to the upper stage 15 by means of the loader of the robot and held at the upper stage by vacuum, the pressed first and second glass substrates on the lower stage 16 may be unloaded. Alternatively, after the upper stage 15 holds the bonded first and second glass substrates 11 and 13 by vacuum and is moved upward and the loader of the robot loads the first glass substrate 11 to be bonded in the next step on the lower stage, the bonded first and second glass substrates may be unloaded. In the above process, a liquid crystal spreading process may be added before the process for unloading the bonded substrates, for spreading the liquid crystal in the bonded substrates toward the sealant. Alternatively, the liquid crystal spreading process may be carried out additionally for spreading the liquid crystal toward the sealant evenly in a case where the liquid crystal does not spread after completion of the unloading. The liquid crystal spreading process is carried out for more than about 10 minutes, under the atmospheric pressure or a vacuum.

Because the substrates become large (about 1000 mm×12000 mm) and the two substrates are bonded after the liquid crystal is dropped, misalignment of the two substrates is likely to occur during the next process or transfer after the bonding. Therefore, a setting process may be added for prevention of the misalignment of the bonded two substrates and maintaining a bonded state during the next process or transfer after the bonding.

Since it is likely that the two substrates are misaligned during the venting, a UV beam may be directed to the sealant, which sets the first and second glass substrates before the venting, or a heat or pressure is applied to the sealant partly to set the sealant, for setting the first and second glass substrates.

The setting is made within the bonding chamber under a vacuum or atmospheric pressure. Though the setting is carried out after the bonding, the setting may be carried out before the bonding is finished. For simplification of the process, though, a material for the setting is the same as a material for main sealing, material for the setting may be different from the main sealing, for improving a setting efficiency. The setting sealant may be a photo (UV) setting resin, a thermosetting resin, a UV-thermosetting resin, a pressure setting resin, or a material with a high adhesive force.

Figure 7:
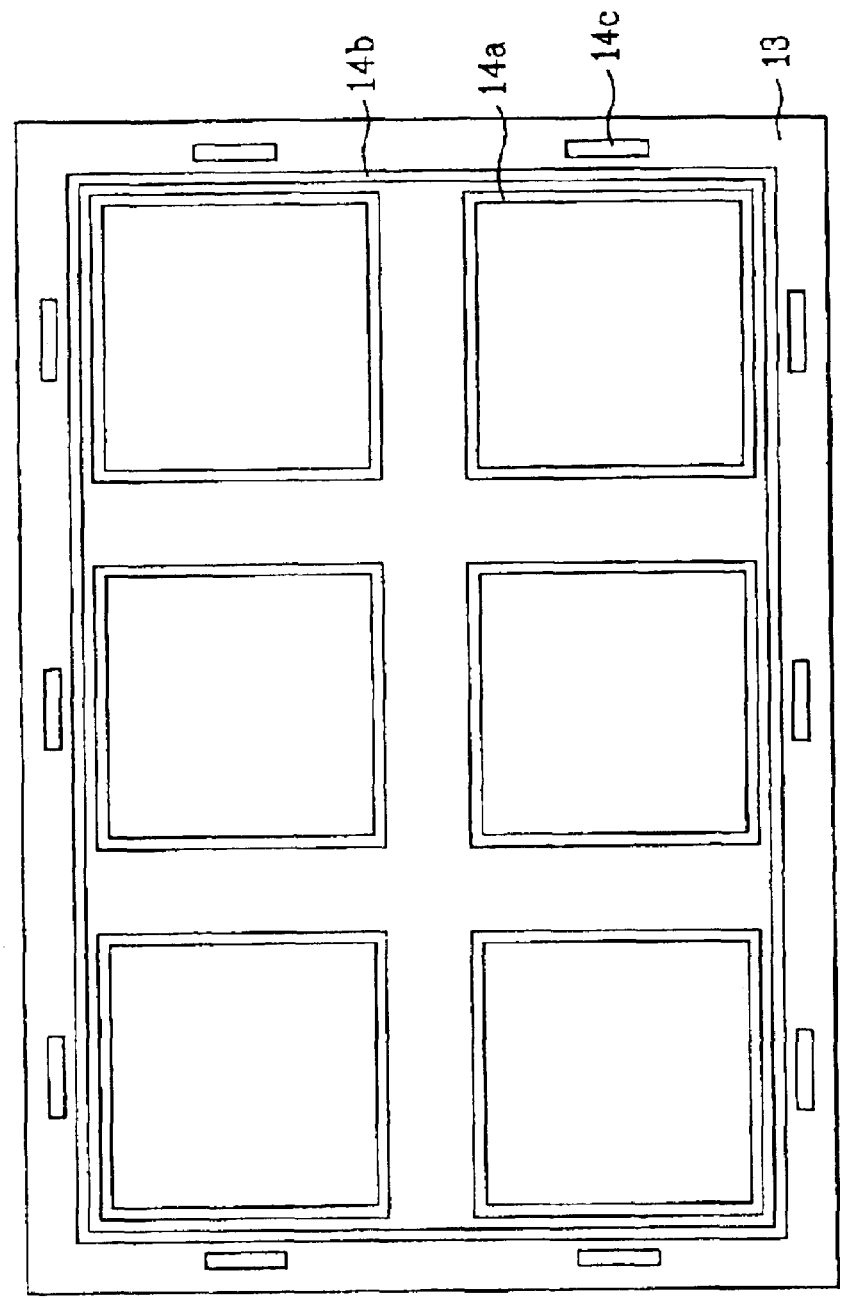
FIG. 7 illustrates a layout of seals for explaining the setting of the present invention.
Figure 8:
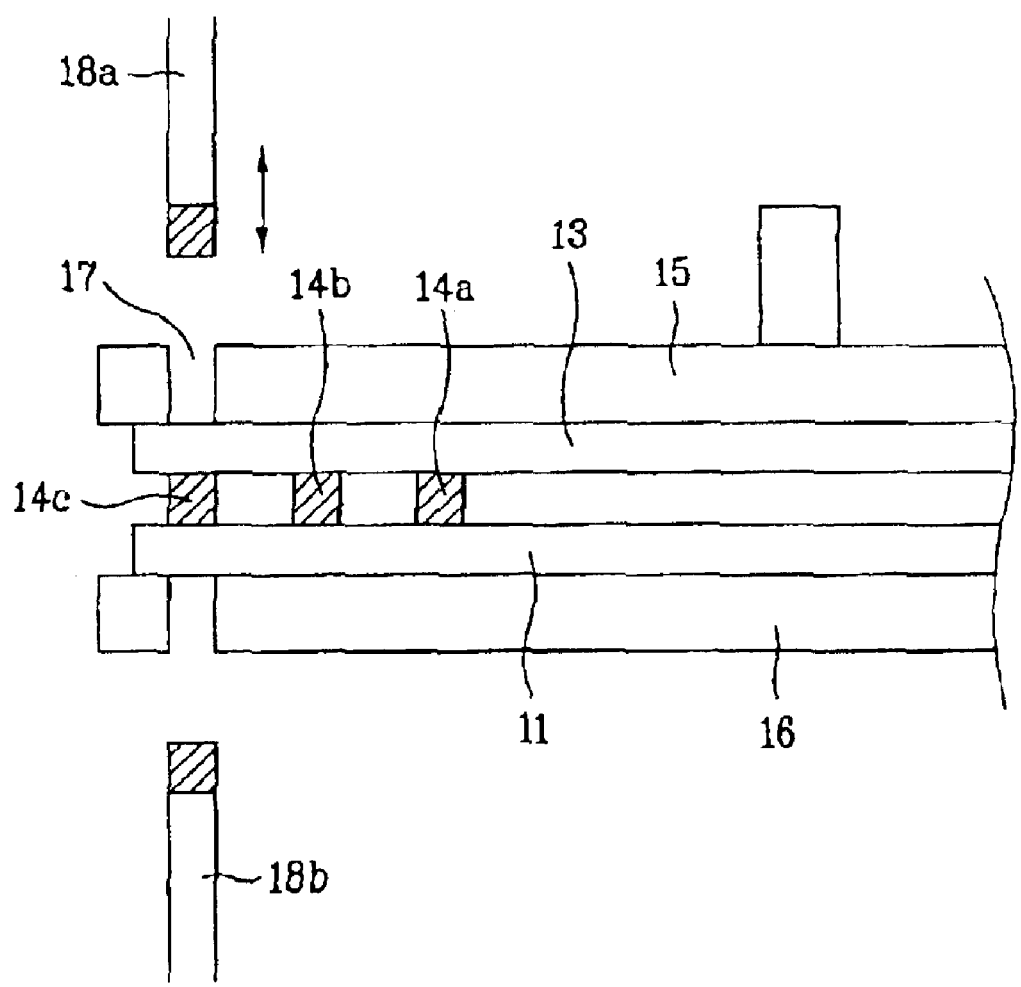
FIG. 8 illustrates a section of upper and lower stages and substrates across line I–I' in FIG. 7.

FIG. 7 illustrates a layout of seals for explaining the setting of the present invention. FIG. 8 illustrates a section of upper and lower stages and substrates across the line I–I' in FIG. 7.

In coating the sealant 14, by using photo (UV) setting resin, thermosetting resin, photo (UV)-thermosetting resin, or pressure setting resin, a plurality of main seals 14a are formed on a periphery of each panel both for bonding the two substrates and sealing the liquid crystal between the two substrates. A dummy seal 14b is formed to surround a plurality of panels for protecting the main seals 14a on an inner side thereof during bonding and pressing, and a plurality of setting seals 14c are formed on an outer periphery of the dummy seal 14b (an outer periphery of the substrate) at fixed intervals, on the second glass substrate 13. Since the dummy seal 14b is provided for protecting the main seals 14a and the setting seals 14c are provided only for setting the two substrates, the dummy seal 14b and the setting seals 14c are removed during cutting.

Thus, after the two substrates are pressed and bonded, the bonded two substrates are set by directing a UV-beam, or applying heat or a pressure to the setting seals 14c. That is, when the setting seals 14c are formed from the UV setting sealant, the UV beam is directed to the setting seals 14c, to set the substrates, and when the setting seals 14c are formed of the thermosetting or the pressure setting sealant, heat or pressure is selectively applied only to the setting seals 14c for setting the setting seals 14c.

Referring to FIG. 8, the upper stage 15 and/or the lower stage 16 have a plurality of holes 17 (about 14) for directing the UV beam or applying heat. Therefore, since the substrates are held at relevant stages after the substrates are aligned to respective stages before the substrates are bonded, it may be assumed that the setting seals 14c and the holes 17 are aligned. Accordingly, upon directing the UV beam, or applying heat or pressure to the setting seals 14c from an upper stage side or a lower stage side through the holes 17, the setting seals 14c are set, to set the two substrates. The UV beam direction to the setting seals 14c is made by a UV beam emitting pin 18a or 18b, which emits the UV beam, moved downward from an upper side of the bonding chamber or moved upward from a lower side of the bonding chamber in a condition of about 50–500 mW for about 5–40 seconds. For example, about 200 mW of UV beam is directed for approximately 14 seconds. When it is intended to set the setting seals 14c by heat, a heating device 18a or 18b is moved downward from the upper side of the bonding chamber or moved upward from the lower side of the bonding chamber. The heating device 18a or 18b comes into contact with a part of the first or second substrates 11 or 13. The setting seals 14c are coated thereon through the holes 17 and heats the setting seals 14c. The heat is applied in a condition of about 50–200° C. for about 10 seconds for selective setting of the setting seals 14c only. The UV beam direction and the heat application may be carried out at the same time.

Of course, though the main seals 14a, the dummy seal 14b, and the setting seals 14c may be formed on the second glass substrate, the dummy seal 14b or the setting seals 14c may be formed on the first glass substrate 11 as the cases demand, and the setting seals 14c may be formed of a material different from the main seals 14a.

Thus, when the bonded two substrates are set, misalignment or deformation of the bonded two substrates can be prevented in the above steps.

As has been explained, the method for fabricating an LCD of the present invention has the following advantages.

First, the dropping of the liquid crystal on the first substrate and the coating of the sealant on the second substrate shortens the fabrication time period up to the step the two substrates are bonded.

Second, the dropping of the liquid crystal on the first substrate and the coating of the sealant on the second substrate, which permits a balanced progression of the fabrication processes of the first and second substrates, permits an effective operation of a production line.

Third, the positioning of the glass receiver under the substrate before the evacuation of the vacuum bonding chamber prevents the substrate held at the upper stage by vacuum from falling down and being broken.

Fourth, both the adjustment of a gap between the first and second glass substrates and the employment of separate cameras in alignment of the rough alignment marks and fine alignment marks permit fast and accurate alignment of the first and second substrates.

Fifth, the sensing of the time when the two substrates come into contact and the varying of the pressure in bonding the two substrates minimizes damage that the dropped liquid crystal may cause to the alignment film.

Sixth, the two-stage evacuation of the bonding chamber prevents deformation of the substrate and air flow in the chamber caused by the sudden vacuum.

Seventh, the pressure application to the bonded substrates by venting the bonding chamber to the atmospheric pressure after bonding the two substrates within a vacuumed bonding chamber permits a uniform pressure application throughout the substrates.

Eighth, the two-stage venting minimizes damage to the substrates.

Ninth, since the upper stage presses down the substrate by means of a plurality of shafts, each of which can apply pressure independently, uniform bonding of the sealant can be made by applying a relatively lower or higher pressure at required shafts when the lower stage and the upper stage are not leveled and fail to bond the sealant uniformly.

Tenth, the inspection of the substrates after the venting for possible misalignment during the venting permits an effective bonding process because the bonding process can be modified according to a result of the inspection.

Eleventh, the simultaneous loading and unloading shortens a fabrication time period.

Twelfth, the conduction of the liquid crystal spreading process shortens a fabrication time period of the LCD.

Thirteenth, the venting at the same time with the separation of the upper stage from the two substrates shortens the venting time period.

It will be apparent to those skilled in the art that various modifications and variations can be made in the method for fabricating an LCD of the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display (LCD) comprising:
   dropping liquid crystal on a first substrate, and forming sealant on a second substrate;
   inverting the second substrate;
   after inverting the second substrate, loading first and second substrates into a bonding chamber;
   aligning the first and second substrates;
   bonding the first and second substrates;
   venting the bonding chamber for applying pressure to the bonded substrates;
   inspecting the substrates; and
   unloading the first, and second substrates.

2. The method as claimed in claim 1, wherein the step of inverting the second substrate includes:
   loading the second substrate on a table of an inverter,
   holding and clamping the second substrate at the table,
   turning over the table, and
   carrying the inverted second substrate to the bonding chamber.

3. The method as claimed in claim 1, wherein loading includes:
   holding the first and second substrates in the bonding chamber, respectively,
   positioning a glass receiver of the bonding chamber under the second substrate held at the upper stage,
   evacuating the bonding chamber, and
   holding the first and second substrates by ESC, and returning the glass substrate to an original position.

4. The method as claimed in claim 3, further comprising:
   first aligning the first and second substrates, after holding the first and second substrates in the bonding chamber, respectively.

5. The method as claimed in claim 4, wherein first aligning includes aligning rough alignment marks only.

6. The method as claimed in claim 1, wherein aligning the first and second substrates includes moving the upper stage downward to the second substrate and moving the lower stage in a horizontal direction, to align the rough alignment marks and the fine alignment marks.

7. The method as claimed in claim 6, wherein aligning the rough alignment marks and the fine alignment marks are carried out by using separate cameras.

8. The method as claimed in claim 6, wherein aligning the rough alignment marks and the fine alignment marks are carried out by a camera focused at a middle point of the second glass substrate and the first glass substrate.

9. The method, as claimed in claim 6, wherein aligning the rough alignment marks and the fine alignment marks are carried out by a camera focused at the mark in the second glass substrate and the mark in the first glass substrate, alternately.

10. The method as claimed in claim 1, wherein bonding includes varying a pressure in at least two steps.

11. The method as claimed in claim 1, wherein venting the bonding chamber for applying pressure to the bonded substrates includes the step of:
    injecting gas or dry air into the bonding chamber.

12. The method as claimed in claim 1, wherein venting the bonding chamber for applying a pressure to the bonded substrates includes:
    injecting gas or dry air into the bonding chamber after the upper stage is started to move upward, before the upper stage is finished to move upward, or after the upper stage is finished to move upward.

13. The method as claimed in claim 1, further comprising holding the bonded substrate at the lower stage before venting the bonding chamber for applying a pressure to the bonded substrates.

14. The method as claimed in claim 1, wherein venting the bonding chamber for applying a pressure to the bonded substrates includes:
    injecting the gas or dry air into the bonding chamber in two stages.

15. The method as claimed in claim 1, wherein venting the bonding chamber for applying a pressure to the bonded substrates includes:
    applying the pressure until a gap between the substrates is below 6 $\mu$m.

16. The method as claimed in claim 1, wherein venting the bonding chamber for applying a pressure to the bonded substrates includes:
    injecting the gas or the dry air at the same time with moving up the upper stage in the bonding chamber.

17. The method as claimed in claim 16, wherein venting the bonding chamber for applying pressure to the bonded substrates includes:
    blowing the gas or the dry air through vacuum suction holes in the upper stage while the upper stage in the bonding chamber is moved upward.

18. The method as claimed in claim 1, wherein venting the bonding chamber for applying a pressure to the bonded substrates includes the steps of:
    injecting the gas or the dry air into the banding chamber, and
    moving up the upper stage in the bonding chamber.

19. The method as claimed in claim 1, wherein moving the upper stage upward in the bonding chamber includes blowing the gas or the dry air through vacuum suction holes in the upper stage while the upper stage in the bonding chamber is moved upwards.

20. The method as claimed in claim 1, wherein inspecting the substrates includes inspecting the alignment marks in the first and second substrates, preparing a database out of a result of the inspection, and compensating alignment of the first and second substrates according to the database.

21. The method as claimed in claim 20, wherein the alignment marks include rough alignment marks and fine alignment marks, and inspecting is carried out by using separate cameras for the rough alignment marks and the fine alignment marks.

22. The method as claimed in claim 1, wherein unloading includes loading at least one of the first and second substrates to be bonded next to the upper or the lower stage and unloading the bonded substrates.

23. The method as claimed in claim 1, further comprising the step of setting the bonded first and second substrates after the bonding process.

24. The method as claimed in claim 1, wherein the first and second substrates are loaded into the bonding chamber with sealant formed on the first and the second substrates, and the setting includes setting the sealant.

25. The method as claimed in claim 24, wherein the sealant includes main sealant and setting sealant and setting the bonded substrates includes setting the setting sealant for setting the bonded substrates.

26. The method as claimed in claim 24, wherein the sealant includes:
- a plurality of main seals for sealing the liquid crystal dropped on a plurality of panels;
- a dummy seal for protecting the plurality of main seals;
- a plurality of setting seals for setting the bonded two substrates; and
- setting the bonded substrates includes setting the first and second substrates by setting the setting seals.

27. The method as claimed in claim 1, wherein unloading includes one of the first and second substrates to be bonded next on the upper or lower stage, and unloading the bonded substrates.

28. A method for fabricating an LCD, comprising:
- loading into a bonding chamber, a first substrate having liquid crystal dropped thereon and a second substrate having sealant coated thereon;
- inverting the second substrate before loading the first and second substrates into the bonding chamber;
- bonding the first and second substrates;
- venting the bonding chamber, for applying a pressure to the bonded substrates until a gap between the two substrates is below about 5 $\mu$m; and
- unloading the first and second substrates.

* * * * *